United States Patent
Wong

(10) Patent No.: US 7,598,854 B2
(45) Date of Patent: Oct. 6, 2009

(54) SYSTEM AND METHOD FOR CREATING A PROXIMITY MAP OF PLURALITY OF LIVING BEINGS AND OBJECTS

(75) Inventor: Chon Meng Wong, 34 Mark Dr., Lincoln, RI (US) 02865

(73) Assignee: Chon Meng Wong, Lincoln, RI (US)

( * ) Notice: Subject to any disclaimer, the term of this patent is extended or adjusted under 35 U.S.C. 154(b) by 64 days.

(21) Appl. No.: 11/363,103

(22) Filed: Feb. 27, 2006

(65) Prior Publication Data

US 2007/0106775 A1    May 10, 2007

Related U.S. Application Data

(60) Provisional application No. 60/657,485, filed on Mar. 1, 2005.

(51) Int. Cl.
*G08B 1/08* (2006.01)
(52) U.S. Cl. .............. 340/539.13; 340/10.1; 340/572.1; 709/223
(58) Field of Classification Search ............ 340/539.13, 340/573.1, 572.1, 573.3, 505, 539.1, 539.12, 340/539.16, 10.1, 825.49
See application file for complete search history.

(56) References Cited

U.S. PATENT DOCUMENTS

| | | | |
|---|---|---|---|
| 4,673,936 A * | 6/1987 | Kotoh | ......................... 342/51 |
| 4,741,245 A | 5/1988 | Malone | |
| 4,747,120 A | 5/1988 | Foley | |
| 4,819,053 A | 4/1989 | Halavais | |
| 4,819,860 A | 4/1989 | Hargrove et al. | |
| 4,854,328 A * | 8/1989 | Pollack | ..................... 340/573.3 |
| 4,885,571 A | 12/1989 | Pauley et al. | |
| 4,952,928 A | 8/1990 | Carroll et al. | |

(Continued)

FOREIGN PATENT DOCUMENTS

| AU | 2003256231 | 11/2004 |
|---|---|---|
| SG | 137652 | 12/2007 |
| WO | WO 00/77688 | 12/2000 |
| WO | WO 2004/100061 | 11/2004 |

OTHER PUBLICATIONS

B.L. Huskey, "Electronic Monitoring: An Evolving Alternative", Perspectives, Summer 1987, pp. 19-23.

(Continued)

*Primary Examiner*—Eric M Blount
(74) *Attorney, Agent, or Firm*—Steptoe & Johnson LLP

(57) ABSTRACT

A proximity network map defines who and what objects have come in contact of each other including location and time. This map selects the list people who have come in contact with known infected people based on contagious disease epidemiology criteria to control its spread, or to prevent radiation poisoning, limit bio-chemicals exposure, etc. These people then undergo testing and quarantine procedures. It monitors hygiene practices and reduces nosocomial infections in hospitals and mitigates the pandemic flu threat by controlling contamination. It controls people interaction, information flow in a high security environment, control crime or gang activities. Each person or object carrying a proximity-sensing unit with unique ID records all units it encountered over a period of time. This information is stored with time stamp in a relational database and transferred to network servers. The databases are then replication throughout via a central web database server for retrieval and analysis.

10 Claims, 9 Drawing Sheets

U.S. PATENT DOCUMENTS

| | | | |
|---|---|---|---|
| 5,019,828 | A | 5/1991 | Schoolman |
| 5,043,736 | A | 8/1991 | Darnell et al. |
| 5,146,231 | A | 9/1992 | Ghaem et al. |
| 5,223,844 | A | 6/1993 | Mansell et al. |
| 5,266,958 | A | 11/1993 | Durboraw, III |
| 5,298,884 | A | 3/1994 | Gilmore et al. |
| 5,317,309 | A | 5/1994 | Vercellotti et al. |
| 5,334,974 | A | 8/1994 | Simms et al. |
| 5,392,052 | A | 2/1995 | Eberwine |
| 5,396,227 | A | 3/1995 | Carroll et al. |
| 5,416,468 | A | 5/1995 | Baumann |
| 5,416,695 | A | 5/1995 | Stutman et al. |
| 5,418,537 | A | 5/1995 | Bird |
| 5,437,278 | A | 8/1995 | Wilk |
| 5,461,365 | A | 10/1995 | Schlager et al. |
| 5,461,390 | A | 10/1995 | Hoshen |
| 5,493,694 | A | 2/1996 | Vlcek et al. |
| 5,497,149 | A | 3/1996 | Fast |
| 5,528,248 | A | 6/1996 | Steiner et al. |
| 5,537,102 | A | 7/1996 | Pinnow |
| 5,541,845 | A | 7/1996 | Klein |
| 5,544,661 | A | 8/1996 | Davis et al. |
| 5,552,772 | A | 9/1996 | Janky et al. |
| 5,559,497 | A | 9/1996 | Hong |
| 5,568,119 | A | 10/1996 | Schipper et al. |
| 5,627,548 | A | 5/1997 | Woo et al. |
| 5,652,570 | A | 7/1997 | Lepkofker |
| 5,731,757 | A | 3/1998 | Layson, Jr. |
| 5,748,148 | A | 5/1998 | Heiser et al. |
| 5,814,797 | A * | 9/1998 | Rifkin ........................ 235/379 |
| 5,818,354 | A * | 10/1998 | Gentry .................. 340/870.16 |
| 5,822,544 | A * | 10/1998 | Chaco et al. .................... 705/2 |
| 5,825,871 | A | 10/1998 | Mark |
| 5,868,100 | A | 2/1999 | Marsh |
| 5,889,474 | A | 3/1999 | LaDue |
| 5,892,454 | A | 4/1999 | Schipper et al. |
| 5,912,623 | A | 6/1999 | Pierson |
| 5,919,239 | A | 7/1999 | Fraker et al. |
| 5,936,529 | A | 8/1999 | Reisman et al. |
| 5,959,533 | A | 9/1999 | Layson, Jr. et al. |
| 5,963,130 | A | 10/1999 | Schlager et al. |
| 5,974,124 | A * | 10/1999 | Schlueter et al. ....... 379/106.02 |
| 5,982,281 | A | 11/1999 | Layson, Jr. |
| 5,990,793 | A | 11/1999 | Bieback |
| 6,014,080 | A | 1/2000 | Layson, Jr. |
| 6,031,454 | A | 2/2000 | Lovejoy et al. |
| 6,054,928 | A | 4/2000 | Lemelson et al. |
| 6,072,396 | A | 6/2000 | Gaukel |
| 6,100,806 | A * | 8/2000 | Gaukel ..................... 340/573.4 |
| 6,130,620 | A | 10/2000 | Pinnow et al. |
| 6,198,394 | B1 | 3/2001 | Jacobsen et al. |
| 6,232,916 | B1 | 5/2001 | Grillo et al. |
| 6,236,319 | B1 | 5/2001 | Pitzer et al. |
| 6,239,700 | B1 | 5/2001 | Hoffman et al. |
| 6,262,666 | B1 | 7/2001 | Lodichand |
| 6,313,745 | B1 * | 11/2001 | Suzuki ..................... 340/572.1 |
| 6,405,213 | B1 | 6/2002 | Layson et al. |
| 6,473,038 | B2 * | 10/2002 | Patwari et al. ............... 342/450 |
| 6,574,482 | B1 * | 6/2003 | Radomsky et al. ........... 455/517 |
| 6,608,559 | B1 * | 8/2003 | Lemelson et al. ....... 340/539.13 |
| 6,972,682 | B2 * | 12/2005 | Lareau et al. ............ 340/568.1 |
| 7,099,895 | B2 * | 8/2006 | Dempsey ..................... 707/102 |
| 7,180,422 | B2 * | 2/2007 | Milenkovic et al. ....... 340/572.4 |
| 7,234,421 | B2 * | 6/2007 | Natividade et al. ........ 340/573.3 |
| 7,295,114 | B1 * | 11/2007 | Drzaic et al. .............. 340/572.1 |
| 7,373,109 | B2 * | 5/2008 | Pohja et al. ............ 340/539.13 |
| 2002/0107008 | A1 * | 8/2002 | Hendrey et al. .............. 455/416 |
| 2003/0204130 | A1 * | 10/2003 | Colston, Jr. et al. ......... 600/300 |
| 2005/0258937 | A1 * | 11/2005 | Neuwirth ................... 340/5.92 |
| 2005/0285740 | A1 * | 12/2005 | Kubach et al. ............ 340/572.1 |
| 2006/0220879 | A1 * | 10/2006 | Chan ....................... 340/573.1 |
| 2007/0062457 | A1 * | 3/2007 | Fantin et al. ................. 119/174 |

OTHER PUBLICATIONS

J. M. Byrne, et al., "Understanding the Limits of Technology: An Examination of the Use of Electronic Monitoring in the Criminal Justice System", Perspectives, Spring 1988, pp. 30-37.

M. T. Charles, "The Development of a Juvenile Electronic Monitoring Program", Federal Probation, Jun. 1989, vol. III, pp. 3-12.

D. Anderson, "Seattle and Tacoma PDs Automated Crime Analysis", The Journal, National FOP Journal, Spring 1990.

R. Block, "Geocoding of Crime Incidents Using the 1990 TIGER File: The Chicago Example", Loyola University, Chicago, Chapter 15, pp. 189-193.

G. W. Brown, Jr., "What impact will personal position location technology have upon the management and administration of mid-sized law enforcement organizations by the year 2000?", California Commission on Peace Officer Standards and Training, Sacramento, California, Jul. 1994.

B. Clede, "Radio computers locate places, and plot them on a map, too", Law and Order, Oct. 1994, http://www.clede.com/Articles/Police/gps.htm.

J. Hoshen et al., "Keeping Tabs on Criminals", Spectrum, The Institute of Electrical and Electronics Engineers, Inc., Feb. 1995, pp. 26-32.

B. Wise, "Catching Crooks With Computers", American City & County, May 1995, pp. 54-62.

L. Pilant, "Spotlight on . . . High-Technology Solutions", From Police Chief, International Association of Chiefs of Police, Document #54650, May 1996.

M. Anderson (editor), "GPS Used to Track Criminals", GIS World, Aug. 1996, p. 15.

W. Baker et al., "Police Vehicle Technology for the 21$^{st}$ Century", From Police Chief, International Association of Chiefs of Police, Document #52068, Sep. 1997.

Albert et al., "GIS/GPS in Law Enforcement Master Bibliography", Nov. 2000.

M. Alexander et al., "An Automated System for the Identification and Prioritization of Rape Suspects", SDSS For Rape Suspect Identification, http://www.esri.com/library/userconf/proc97/proc97/to350/pap333.htm, Jul. 2001.

* cited by examiner

SYSTEM AND METHOD FOR CREATING A PROXIMITY MAP OF PLURALITY OF LIVING BEINGS AND OBJECTS

CORRESPONDING RELATED APPLICATIONS

This application is related to Provisional Patent Application No. 60/657,485 (the "'485 application"), filed on Mar. 1, 2005. This application claims the benefit of and priority to the '485 application.

BACKGROUND OF INVENTION

This invention relates to the general method of tracking and notification system for the purpose of tracking of movement of people or objects in close proximity. The importance is that if an event is to be traced because of close contact, this system provides an efficient method of actually identifying the people or objects that are within this network during any given period so that testing and quarantine procedures can do done accurately and precisely.

For example, in a hospital environment, if there is a contagious disease outbreak and each patient, it is required to identify the people exposed to the infectious agent within a certain distance. If all visitors and staff in the hospital are tagged with proximity detection and identification device and their movements and locations tracked in a form of contact or proximity map and saved as a database. By retrieving the database records for the specified time, it is possible to isolate which staff member or other patients have been exposed to the particular patient, who has a positive test for the contagious disease result. It can be used for monitoring and control nosocomial infections which is responsible for many deaths each year in hospitals.

This system and method provides you with a traceability of anyone who has come in contact with a dangerous disease and there is recourse to correct or contain such an event. Contagious disease such as tuberculosis, small pox, chicken pox, avian flu, Severe Acute Respiratory syndrome (SARs), etc. can be contained once the list of people, who are in close proximity with the infected patient, can be identified.

In another example, there could be a shipment of goods, which can be affected by the cargo placed near it. For example, radioactive substances, biochemical agents, biochemicals, contagious disease livestock, are cargo that would endanger other cargos etc.

In each case, you would not need to quarantine unnecessary people or cargos that are not exposed to the danger source. Furthermore, pinpointing the exposed people or cargo can be performed much quicker. In cases of emergencies, the database containing such information has to be updated, synchronized and self-reporting.

This invention also allows you to access notification reports from any local database through a distributed network servers using the Internet to replicate and synchronize its data.

The previous methods use to control the spread of infectious disease in a hospital or dangerous elements exposure is:

a) Blood sample testing all the hospital population including visitors, b) Use indirect observations for those infected such as temperature measurement, c) Quarantine all people who are on the duty roster working within the danger area.

d) Deploy surveillance camera throughout the hospital and record all activities

The blood sample testing of hospital population including visitors is an accurate method but is a very slow process since blood sampling takes time and its analysis also take significant amount of time before a determination can be made. If the hospital population is large, this method is determined impossible.

In the case of SARs, indirect measurements such as body temperature via thermal cameras are used to identify potential SARs carriers. However, not all SARs patients have these symptoms at the start of infection. Therefore many potential SARs carriers can still skip through.

Quarantine everyone working in the infected area does not account for those who are infected due to unscheduled visitors.

SUMMARY

Everyone within the population uses a contact or proximity-sensing device with a unique identifier. All units that come in contact will record this unique identifier. Each device unit will have a list of which it has encountered and how distant are these contacts. Each record has an associated time stamp. A detail triangulation map of contacts can then be constructed. A contact network map consisting of description of location of each individual with a time stamp is generated and stored as a record in the relational database. A distributed network map entry system collects all maps from each individual in its contact neighborhood. All movements are expressed as a moving network mesh of triangles with time stamp, which in turn can be represented as time dependent matrices. The local database resides on a local network server and constantly updated. The contact network map is made complete through exchange of network maps from other server locations through the Internet using a central web database. The database is replicated and synchronized allowing every local server capable of generating reports during analysis. An algorithm using the matrix elements and time sliced iteration procedure can list the people in contact under specific criteria accurately from the database.

DETAILED DESCRIPTION OF THE PREFERRED EMBODIMENTS

This detailed description of the preferred embodiments serves as a guideline how it can be implemented in a preferred manner. It illustrates the concept and does not limit the scope of the invention. However, the organization, operation, advantages and objects of the invention can be more fully appreciated from the following description.

1) System Components

Figure 1:
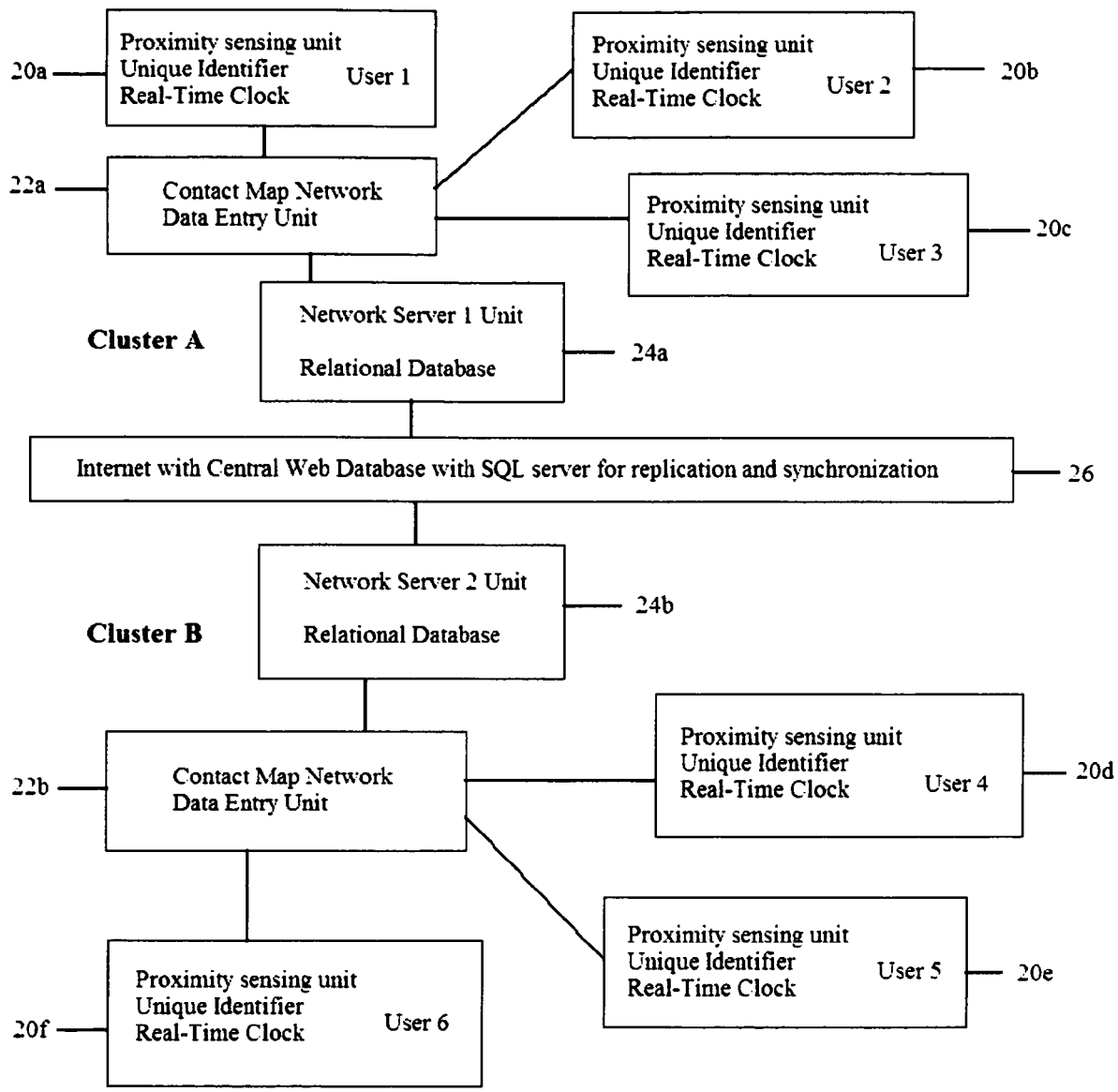
FIG. 1. Block elements of a distributed contact or proximity tracking system with web database and notification system FIG. 2. Block diagram showing how a proximity sensor is constructed out of using a bidirectional RF transceiver chip controlled by a microcontroller with a clock to keep time.

FIG. 1 illustrates a block diagram of a distributed contact or proximity tracking system that implements all the above functional roles. This figure illustrates a system in a two geographically isolated clusters configuration. In general, a typical system has many clusters but each proximity tracking system include the following four types of units, namely, a) proximity sensing unit, b) contact map network data entry unit, c) Network servers with built in relational database unit, d) Internet with a Central Web Database server unit.

A cluster contains multiple units of first three types but they all interlinked with one another through an Ethernet network or a much broader network through Internet with a Central Web Database server unit.

FIG. 1 shows a system with cluster A having proximity sensing units 20a, 20b, 20c, and cluster B having proximity sensing units 20d, 20e, and 20f. The proximity sensing units are mobile units and will communicate with each other using a two way remote (such as wireless) communication when they approach one another within communication range. The function of these units is to generate the contact network map. The three components required to generate this map are namely, the proximity sensors for measuring distances, unique identifiers to distinguish each unit, and a time keeper for time stamping an event. The following contact information will be stored in its memory:— a) units with which they come in contact, b) timestamp of contact, c) duration of contact, d) distance of contact and their relative vector location with respect to one another, e) total number of distinct contacts made after the last download of contacts, f) remaining battery life of units with which the unit came in contact, g) log of last known good transfer of information (i.e. the time window in which the contact information was transferred, total number of distinct units contacted, the destination unit to which the information was transferred, and acknowledgement that the transferred information was successfully transferred), h) optional GPS information (if GPS location module is used to identify location), i) optional information such as temperature, radiation exposure, virus exposure, if the special sensors are connected to these proximity sensing units, j) optional alert information where quantities described in item i) exceed their normal range of safety, k) Any other additional information.

This contact information data is known as contact history. This dataset is used to construct a contact network map, which defines the topology of the network of these units at each time frame with attributes that include duration of each contact.

Like the proximity sensing units, the contact map network data entry units such as 22a, 22b are capable of remote (such as wireless) communication with one another and also to the proximity sensing units, 20a, 20b, 20c, 20d, 20e, 20f and the network servers units, 24a, 24b, that are within communication range. In this example, the proximity sensing units 20a, 20b, 20c are in communication range with contact map network data entry units such as 22a for the cluster A; the proximity sensing system units 20d, 20e, 20f are in communication range with contact map network data entry system units such as 22b for the cluster B.

These contact map network data entry units can either be mobile or fixed in location. These units have much larger memory capacity than the proximity sensing unit. They are also capable of a longer communication range and have longer battery life or are connected to a permanent power source (such as wall outlet). However, these have additional responsibilities beyond those of a proximity sensing unit. They receive the contact history from the proximity sensing unit with which they are communicating; the proximity sensing units can then reclaim its memory store for storing new contact histories. These units can store several contact histories from several proximity sensing units. In order for the information storage to be efficient, overlapping or redundant information from other units can be condensed. After collecting the contact histories, the contact Map network data entry unit will in turn download remotely (such as wirelessly) all the histories of contacts to any Network servers with relational database units that are within communication range.

The Network Servers will take in all the contact histories from both the contact map network data entry units and from the proximity sensing units that fall within its communication range. These histories will be consolidated and stored in its large relational database. The contact network map data when converted into a matrix format allows a structure for data storage and also for retrieval. Examples of this matrix formulation will be discussed later. Network Servers are installed in known locations (reference points with known coordinates). In FIG. 1 the two Network Servers, 24a, 24b, are located in two separate Clusters A and B, which are geographically separated. Each cluster will have its proximity sensing units, its Contact Map Network Data Entry units and its Network Server units.

A Central Web Database can be hosted on the Internet, 26, which serves as a broader network to link all network servers. All Network Server databases are synchronized and replicated throughout the system. A discussion of synchronization and replication will be presented in a subsequent section. The Network Servers have substantial computational power, long communication range, a large relational database server and a fast network link to a local Ethernet network like a network hub (wired or wireless). Therefore all network servers have permanent power source and they are active at all times.

Consequently, these network servers form a distributed network of relational databases containing contact histories, contact network maps with unique identifiers, etc.

In the next few sections, details of implementing these units and how each role is fulfilled will be discussed.

2) Contact or Proximity Sensing Units

Figure 2:
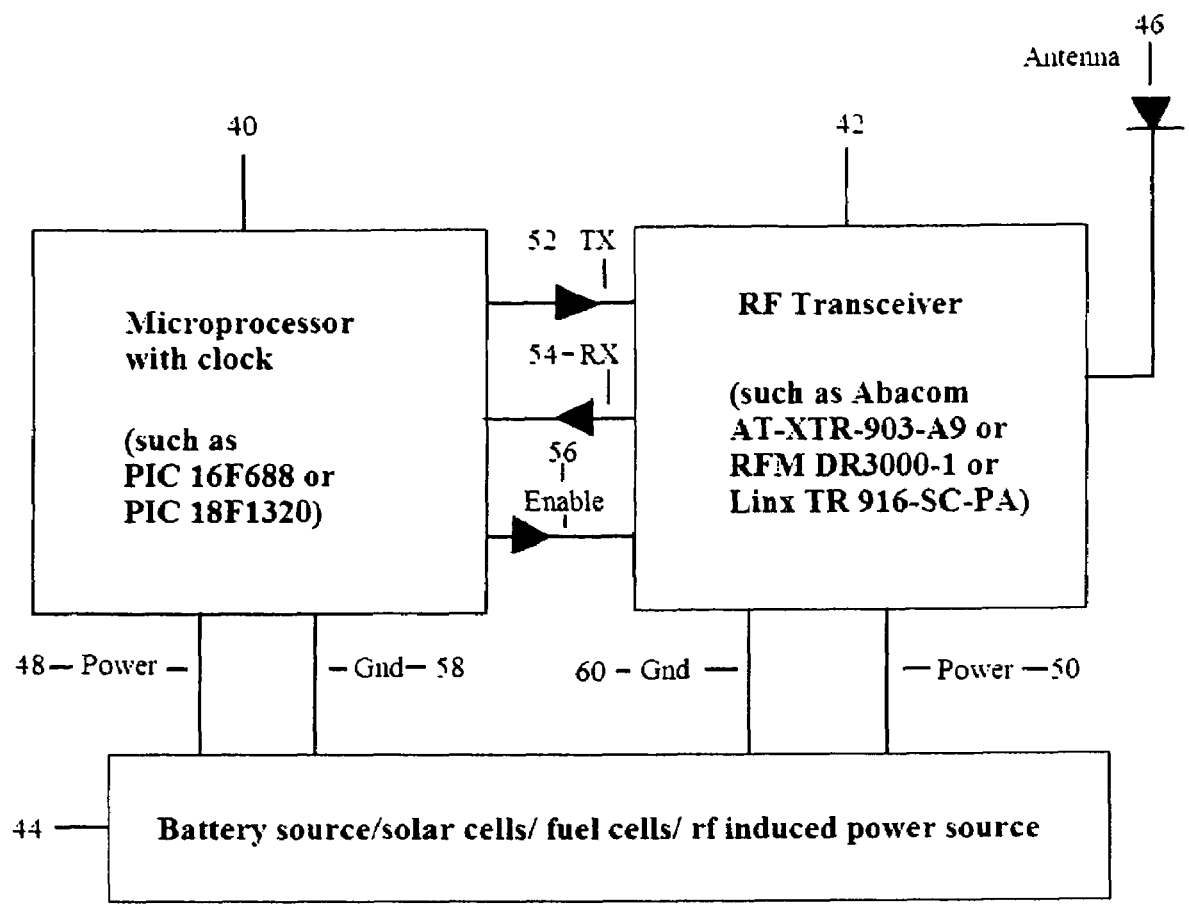

FIG. 2 shows an example of a proximity sensing unit which uses a microcontroller, 40, for controlling and communicating with a two-way remote (such as wireless) communication module designed using a bidirectional transceiver, 42. This transceiver communicates with the microcontroller via a Transmit line, 52, and a Receive line, 54 at a given baud rate. The Enable line, 56, allows the mode of the transceiver to be configured for Transmit, Receive or sleep. The sleep mode allows the transceiver to conserve battery power supplied by the power source, 50, and ground lines, 60. The transceiver, 42, also has a built-in antenna, 46, to transmit and receive radio frequencies signals. Abacom AT-XTR-903-A9, RFM DR3000-1, DR3300, and Linx Technologies TR916-SC-PA are examples of this class of wireless bidirectional RF transceiver modules.

The microcontroller is powered from the line power, 48, and a ground line, 58. An example of a microcontroller with an internal clock is an 8 bit Microchip PIC16F688 or 16F690. Another example is the Microchip PIC18F1320, which has higher performance and computational capabilities. Any of these can be used by the contact map network data entry units.

A Proximity sensing unit with contact network map generation is a system that uses proximity sensors to capture proximity parameters such as:

a) identities of their neighboring units, b) distances between each of its neighboring unit, c) directional vectors location of each neighboring unit, d) timestamp of contact, e) duration of contact, f) total number of distinct contacts made, g) remaining battery life of units which have been contacted, h) log of last known good transfer of information and transfer destination, i) optional GPS information, A proximity sensor unit is attached to each mobile user or object. It should be light, small and functional over a reasonable time period. This system enables the presence of two or more people or objects to be detected in order to create a proximity network map. The following technologies can be used in the proximity sensors to measure distances or locations:— i) Radio Frequencies, ii) Infrared signals, iii) Optical (visible) signals, iv) Ultrasonic signals, v) Radio Frequency Identification technology (RFID), vi) Global Positioning System (GPS) technology.

vii) Cellular phone technology

The choice of sensors depends on the functional requirement of the system. In many situations it is necessary to detect two or more persons within a radius of 20 feet. A simple and small bidirectional wireless RF, infrared, optical or ultrasonic transceiver system can implement a proximity sensor. The transceiver has dual role. It functions as a proximity sensor to measure distance and also for communication with the units it encounters. Both GPS and cellular phone technologies work to provide actual position coordinates based on either satellites or cell towers respectively. They will also be discussed in later sections.

A unique identifier is required for each device unit. This can be in the form of a string of alphanumeric number or digits. All the devices that come into proximity with each other record this identifier. This implies all devices that are in contact know each other's presence. This is particularly important because if some units are lost or destroyed, the information passed to them is not necessary lost but could have been passed to other units where contacts that have been made that still remain in the system. In other words, other units that came in contact with the lost units would still retain the contact records. Therefore the method has inherent redundancy in protecting the contact map's integrity and accuracy. This feature is very important because not all units are always accountable in real situations.

The population of the mobile users or objects to be mapped determines the type of identifier to be used. This unique identifier is first registered to the user or object on which it attaches. Therefore a relational database is required to tie between the proximity units and the user identifier. The user identifier can be any one or more of the following identifiers such as the name, address, social security number, passport number, driver license, date of birth etc. Should a sensor fail, a replacement is made. Therefore the relationship between proximity sensors to user is a many-to-one relationship. In addition, the time of deployment of the system to the user is also recorded accurately on the database.

The proximity network map is dynamic and each set of data has a real time stamp attached to it. This time stamp is important for grouping the proximity/distance information to form the elements of the contact network map matrix, M. The microcontroller also has a real-time keeper to associate the network data with a time stamp. A real-time operating system (RTOS) can be implemented into a real-time clock in software using the clock of the microcontroller.

Referring to FIG. 2, the Abacom transceiver module, 42, AT-XTR-903, operates at 902-928 MHz and has 169 distinct channels with a range of 600 ft. An important feature of this transceiver is that it allows a user to adjust its emitted power, which is important for setting the range (distance) of communication with its neighbors. On the other hand, the 169 distinct channels allow it to communicate exclusively with 169 distinct users operating in its vicinity within a 600 foot radius concurrently A module shown in FIG. 2 can be implemented in a hospital environment as a proximity sensor. The microcontroller can preset the transceiver to operate at a certain frequency channel and also a certain baud rate for the transceiver chip either to transmit or receive. It is useful for all units first to preset to a single common frequency channel for communication during first encounter before switching to other channels for measuring distance or other purposes. The two-way communication is required for the exchange of unique identifiers and distance measurements. In addition, it also has a non-volatile flash memory to store the contact IDs and their respective distances from each other. The program should be capable of avoiding duplicate information if the known contact has been made within a certain period. These rules are application specific.

3) The Contact Map Network Data Entry System Unit

Figure 3:
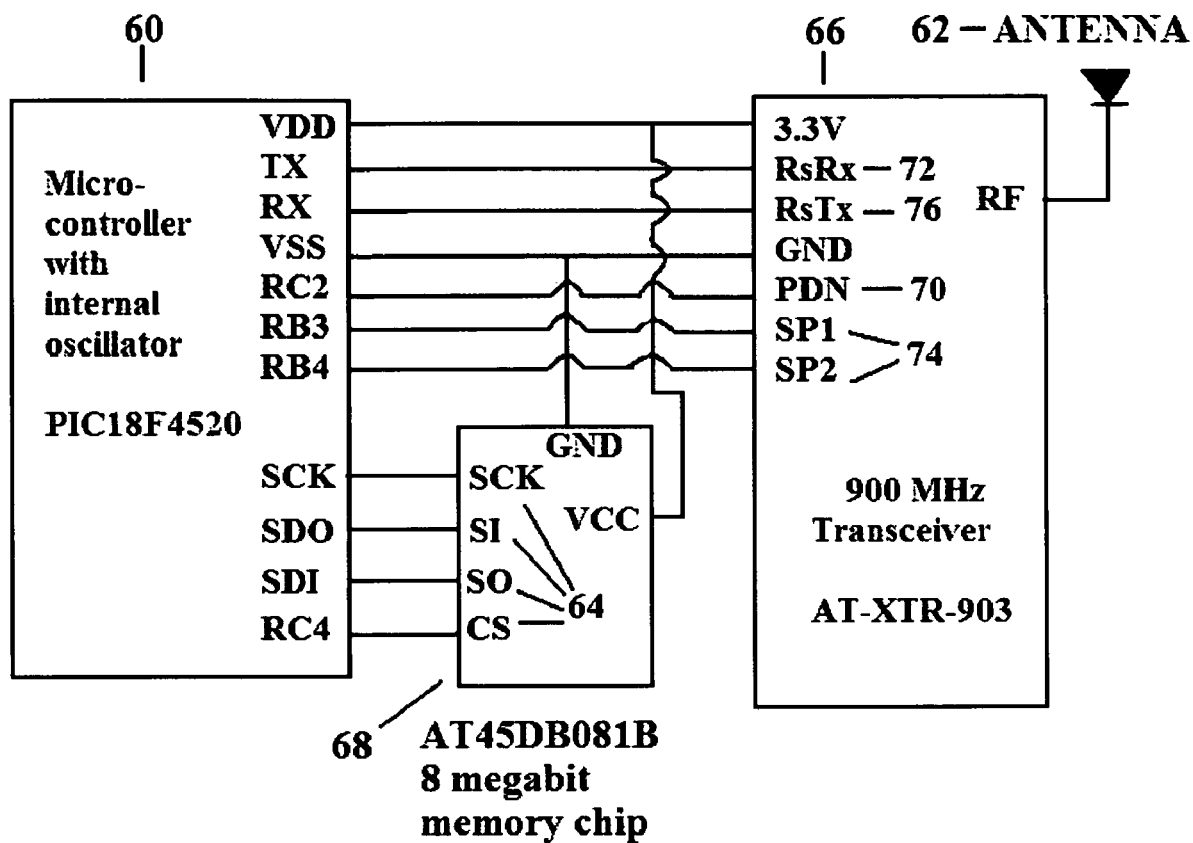
FIG. 3 shows a the contact map network data entry system

FIG. 3 shows the contact map network data entry unit using Microchip microcontroller, PIC18F4520, 60, with a large 32K of flash program memory and an external 8 M-bits flash memory chip, 68. Via the PDN pin, 70, this microcontroller controls the power state of the transceiver chip, AT-XTR-903, 66, with antenna, 62, The speed of communication by the RsTx, 72, and RsRx lines, 76, is controlled by SP1 and SP2, 74, for baud rate settings. The external flash memory such as Atmel 8 M-bit memory chip, AT45DB081B, 68, can be used to store contact histories via the built-in SP1 bus, 64, to the microcontroller, 60. This unit can attach to a mobile user or object with a form factor such as a badge or a wrist/leg band. The unit attributes are light, small and on board battery power sufficient to last for a reasonable period of time. Each unit is then identified by its unique identifier stored in its non volatile memory. The microcontroller unit, 40, has a clock either internal or external. A real-time clock capability can be implemented in software allowing it to characterize an interaction event by a timestamp, its contact duration with its neighbors, identified by their respective unique identifiers, when they are within the communication range. These events are stored in a database known as a proximity network map which characterizes the history of interactions among the users or objects that carry such mobile units.

The Network Map containing all the data points of other units it encountered is stored in each proximity sensor unit's memory. These contact network map data to be consolidated and downloaded through distributed entry network servers. Once the data is transferred from a proximity sensor unit to a distributed entry network server, its own memory can be cleared.

A contact map network data entry unit has a bidirectional transceiver. It also has a very large memory and a microcontroller with a program for downloading all the contact maps from other neighboring units that come within its range. A mobile data entry unit can be worn by one of the users, which acts both as a proximity sensor unit as well as data entry unit. Upon interaction with other units, it downloads the entire network map history including time stamps from all units it encounters.

The units from the same clusters tend to contain portions of their contact map common to each other. A dedicated microcontroller can simplify its data entry by adding to its existing contact map the new nodes within the existing network. Ideally, a mobile data entry node is normally attached to a user, who would travel to several locations during the day. This will allow information to be uploaded more frequently for the overall contact maps. In turn, these mobile data entry units dump their entire collected network maps to a fixed location map data entry unit. Normally there should be many more mobile units for each one stationary unit.

In addition, the fixed location map data entry unit is also equipped with a communication network capability. Ideal locations for stationary data entry units are high traffic doorways of buildings. This system functions like static door security system but with an added advantage of not impeding a person's movement. This communication network allows all its collected data be downloaded to a computer acting as a network server. A fixed data entry unit has a transceiver unit with microprocessor connected to an embedded system or personal computer via its input ports such as serial USB, RS232, Firewire, parallel port etc.

4) The Network Server Unit

Figure 4:
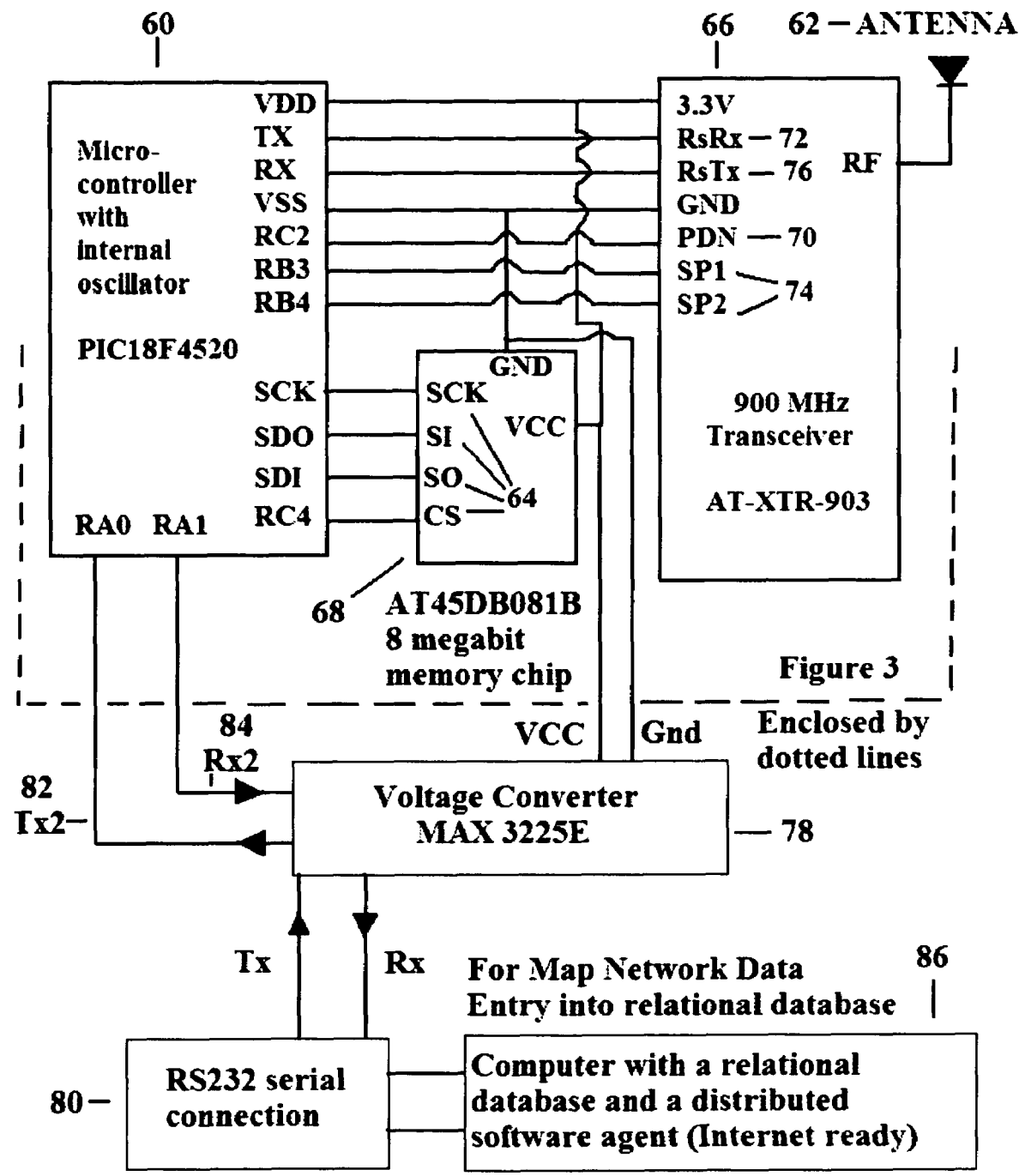
FIG. 4. Block Diagram for a network server with serial communication port to a computer with database FIG. 5. Distributed Network servers and Central database servers are connected through the Internet for replication and synchronization FIG. 6. Principle of replication and synchronization of the relational database throughout the distributed sites.

FIG. 4 shows the block diagram of network server comprising a transceiver chip, 66, in serial communication with a microcontroller, 60, with the serial port, transmit line, Tx2, 82, and Receive line, Rx2, 84, via the Max3225E RS232 signal converter, 78, for data entry to a computer, 86 or network. Each network server is then connected to Internet to communicate with other network servers.

A network server unit shown in FIG. 4 is an enhanced version of the FIG. 3. This serial connection allows contact map network data to be transferred into a relational database in a networked computer, 86, with Internet access.

The contact network map data is a set of records stored in the relational database with distance, directions and time stamp information. This relational database also links the user identifier to this contact network map which can be formulated into a matrix. User identifier information is created during the user contact sensing system setup period. This information is vital during database analysis.

The contact data can also be stored in the embedded microdatabases especially when external chip memories, 68, are available as shown in FIGS. 3 and 4. The matrix elements can be stored as records in a Particular field. Storing of records are easily performed using standard database procedure calls.

A relational database allows all records, which have an established relationship, to be extracted through a set of criteria. Such information is extracted through the use of queries. Microsoft SQL servers, MS Access Database are examples of relational database using the SQL language.

If Center of Disease Control (CDC) decides to quarantine people within the vicinity of 50 feet from the infected person, a series of queries are performed on the database. The first query determines who are within the range of the infected patient. A second query is then performed on those people found in the first query. A third query is then performed on those people found in the second query. The results of these queries form a tree of contact. The methodology given in section 2 can be implemented with function calls, stored procedures, macros, etc. in database programs. Each of the carrier contact map is then searched for and iteratively processed for each time slice. Finally, a list of infected persons is then generated as a report.

5) Central Web Database

Figure 5:
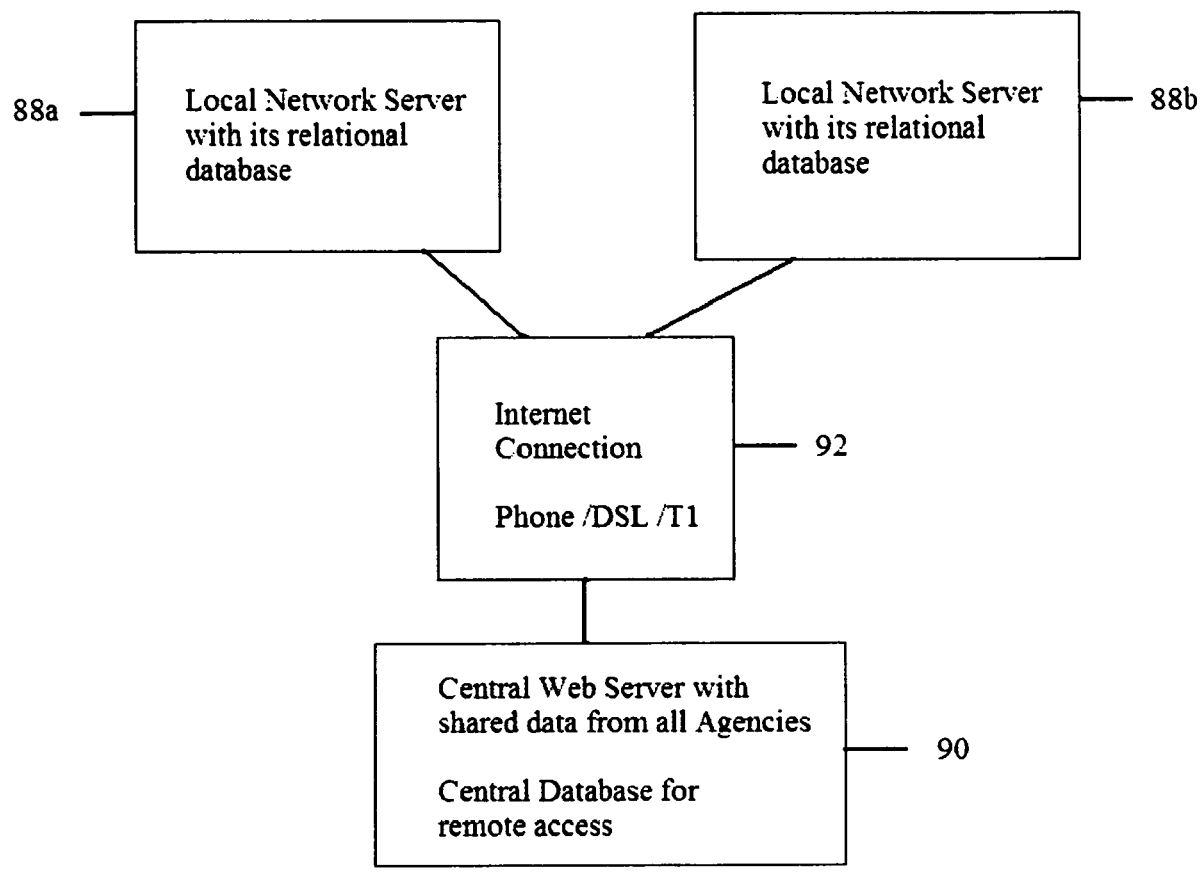

FIG. 5 illustrates there are two network servers, 88a, 88b, and a central database server, 90, connected to the Internet, 92, via phone/DSL or T1 lines. A central web database is a SQL server database hosted on the Internet by an Internet Provider. This database server is accessible through the Internet via its URL address. These databases are customization by users after they uploaded their own web services and stored procedures. The contact network maps stored in the network servers located in different geographical regions are very different. The records in network server, 88a, which is in a different geographical region from the network server, 88b, would therefore be different.

If collective contact histories stored in these relational databases belonging to other network servers are required, then request of these records have to be made from these network servers individually. Since there can be a lot of these network servers distributed across the Internet, many of these requests many not be serviced at the instant of request. These issues may be due to downtime of the web or server or other unforeseen problems.

The use of a central web database will resolve these problems by constantly receiving and storing queued messages containing records that are new, recently edited or deleted from each of the local relational database residing in each of the network servers. The local network servers will also download those messages which itself did not generate and store it in a separate relational database. The action of constant uploading its own records to the central web database and downloading records from the central web database belonging to other networks will in effect accomplish replication and synchronization of all databases. Such replicated databases will allow database records to be accessed at any location even when the Internet is down some of the time.

Figure 6:
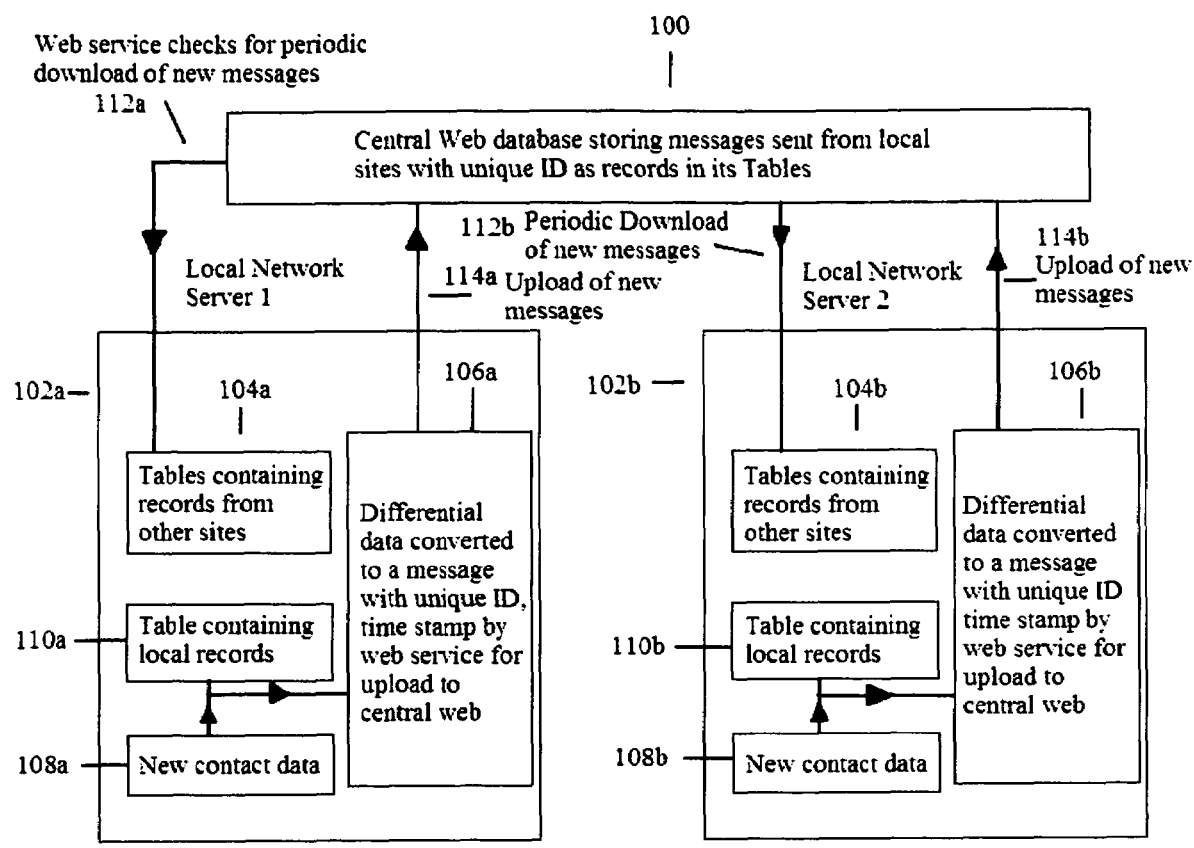

FIG. 6 shows a block diagram the components that are need in the central database, 100, and the other components residing in each of the local network servers, 102a and 102b.

In reality not all network servers are connected to the central web server, 100, via fast broadband network like T1 or T3. The following description explains how this invention addresses the vast difference in connectivity speed between the network servers and the central database server without detrimental effects to its database replication and synchronization process. This vast difference in connectivity speed demands the method of data entry to be highly efficient.

FIG. 6 shows that each network server has several different tables in its database. One set of table is used to store the contact map network data, 110a, from its local network server, 102a. A second set of tables is used to store the contact map network data, 110b, belonging to the second network server, 102b. A third set of tables is used to store the contact map network data from the third network server and so on. There will be X sets of tables if there are X number of network servers.

There is also another table responsible for keeping track of information what local new records have been added, edited or changed. When a contact Map network data is entered in the local network server, 108a, a time stamp and a unique message ID and stored as a record in this table, 106a. It also classifies whether this data is a new data entry or an edited entry or a delete of record in the current local map database. A full message containing the data, time stamp, network server ID, its classification, and labeled with a unique message ID, is generated as a record in the table, 106a.

This message is now ready for uploading into the central web database, 100. For security purposes this message is also encrypted. An agent software, 114a, residing in the local network server is responsible for uploading this encrypted message. Similarly, Network server, 102b, will have its own agent software, 114b, to upload its message to the central web server, 100.

Each local network server has another web service software agent, 112a, which periodically checks the central web database server, 100, for any messages, it did not originate and decrypt it during download. The unique message queue ID, and time stamp alone uniquely identifies whether this message is from another network server and also determines whether it is new. If the message did not come from the local data entry site, it will also have a different network ID. Any new time stamp and message queue ID, will not be found in its table, 106a. This message is then downloaded and updates the tables, 104a, associated to its network ID.

The central web server serves only as a temporary web database to store all these messages and also a clearing house. The very old messages can be deleted from the central web database after all network servers have downloaded in order to reduce its volume of storage.

Since all messages are encrypted in the central web database, intrusions into the central web database do not compromise the security of the system. The software agent, which is also known as a web service, has to authenticate itself with a secure login and password for all transactions with the central web database. Unlike the normal website where its SQL database resides with a published URL address, the use of web services as a software agent the URL can remain a secret and therefore protects the database from intruders. Only the web service software agent knows which URL is being used and the URL address can also be changed. If necessary several URL addresses can be used so that the information is dispersed. The web service communicates through an assignable unique port address that is protected by firewall. This is an added security. This method of utilizations of web services conforms very well within the dot net (.Net) framework that Microsoft has established. The use of message queue technology for replication and synchronization of database record entry method has been tested successfully to work across the northeast and west coast of America.

The transfer of only differential data and the method of using new message for uploading this data to central web database also minimize the data transfer volume across the network connection to the web. The traditional method of replicating all records in the tables demands extremely high bandwidth connectivity, a luxury which many systems do not have.

Another feature offered by such synchronization technology is its ability to change synchronization time. The user at their local network server sets its own the synchronization frequency. This frequency can be tailored accordingly to the local web access connectivity speed. Therefore the slower networks such as phone modem connection can coexist with other network servers having DSL connection.

Another advantage of this technology is that all information are locally available in these replicated network servers, occasional web connectivity downtime do not degrade performance. Analysis reports and queries can be performed instantaneously at any time from any network server location.

6) Proximity Measurement

Figure 7:
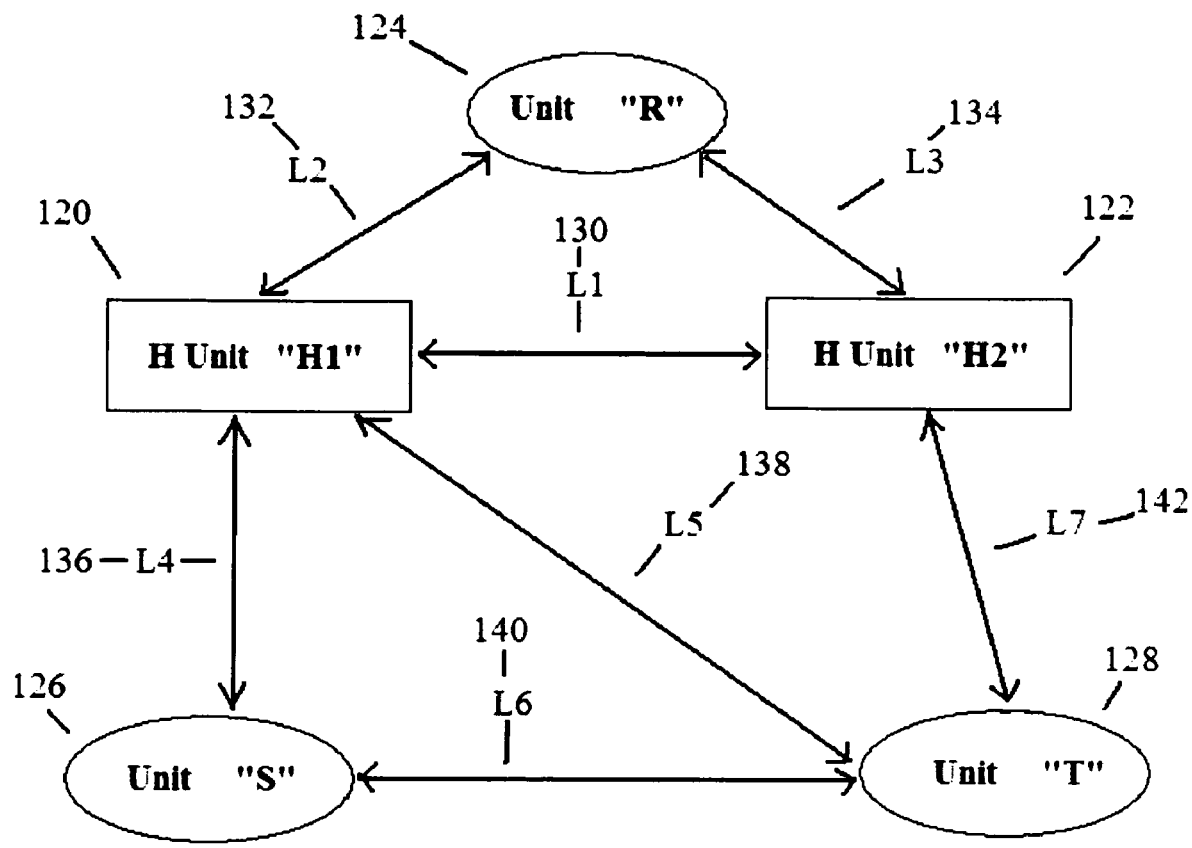
FIG. 7. The triangulation methods for determining "R", "S" and "T" units position.

FIG. 7 illustrates the mobile proximity sensing units, R, 124, S, 126, T, 128 making proximity measurements with units H1, 120 and H2, 122. From the proximity measurements, units can determine their relative locations among themselves through triangulation. Absolute locations require some of these locations to have known coordinates. The proximity distance measurements are made using the following methodology.

In the section on contact or proximity sensing units, the RF transceiver, 42, in FIG. 2 has two capabilities. The first is the transmitter power adjustable capability and the second is its receiver signal strength indicator capability. These two capabilities allow the distance measurements to be made. When the transmitter power is reduced step by step, the reception distance is reduced. The reception distance between two transceivers on the same channel is estimated to be that when the RF reception is marginal. The Received Signal Strength Indicator (RSSI) is an estimate of the radiation power of the reception. As the transmitted power is being reduced in a predictive manner over a short time frame, it can be assumed that all the units are relatively static in their positions. Since the radiation power law (see equation 1) obeys the reciprocal of the square of the distance between the transmitted power unit and the receiver unit, this distance can be calculated by using the equation over several values of emitted power. Under the static situation, the angle $\theta$ does not change; the value of A is constant.

Radiation Power from a Half-Wave dipole Antenna,
$$P = A*I*I/R*R \tag{1}$$

Where $A = 15*\{(\cos[(\pi/2)\cos\theta]/\sin\theta)^2\}/\pi$

I is the dipole current, $\theta$ is the angle between the dipole and the reception location, R is the distance between dipole antenna and the reception location.

Several RSSI readings corresponding to different transmitted power should be performed. Should the distances obtained using the above equation from these measurements differ from the actual distances measurement, a scale factor should be introduced.

This reception distance is also dependent on the antenna design because the RF signal may not be uniformly distributed in a radial manner. Other errors include reflection and the materials sandwiched between the antennas. In many applications, a proximity measurement using a radial contact distance of 600 feet is adequate. Several techniques discussed below will help to overcome these issues.

A coded transmission is works better in a noisy environment. This is because there are other devices like cordless phones that work within the same frequency band; 900 MHz in this example. Multiple frequency channel selection is also useful in a noisy RF environment. Sometimes it would be necessary to switch to other channels to avoid RF interference for its base band communication.

Triangulation allows the relative vector location of the units be determined. If there are three transceivers operating on the same frequency and all of them have the marginal signal reception among each other, then the three transceivers are likely to form an equilateral triangle with a known distance. If the reception signal strengths are not identical, then a non-equilateral triangle is formed. The sides of this triangle are also known. FIG. 7 shows a triangle formed by unit R, 124, H1, 120 and H2, 122, with three sides L1, 130, L2, 132 and L3, 134.

Each of the transceiver's microprocessor can be programmed to use an algorithm of changing channels to determine the number of transceivers in the neighborhood. If there are more than three units are found, one of the unit will take the role of a master unit informing other units to change their frequency away from the master. The switching of channels by each unit sequentially, there will be an instance where are three units are left on the master frequency. Using the triangulation method and transferring the master role from one unit to another, it is possible to determine all the relative positions and directions of one from another. A visual map consisting of triangles can then be formed. This visual map is the proximity network map.

Since these units are mobile, the microcontroller controlled transceivers can perform all the triangulations steps within a relatively short period freezing the network map in an almost static condition. This process is being repeated over and over again to create a dynamic network map.

Figure 8:
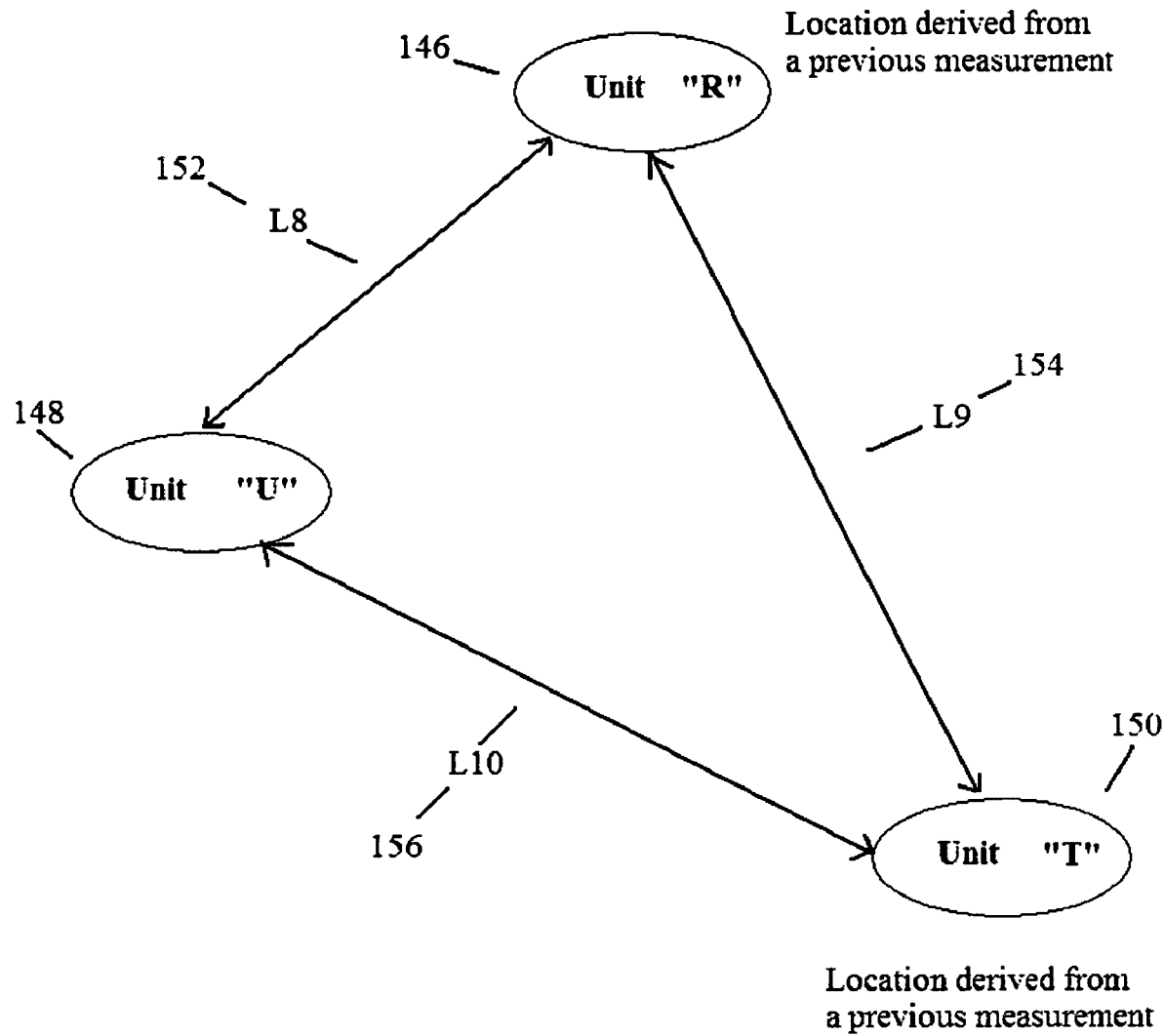
FIG. 8. Triangulation for three mobile modules given two mobile units with derived known locations.

FIGS. 7 and 8 show examples how absolute locations are identified in a network map.

Case 1 (Location by Distance Measurements Between Two "H" Units)

In FIG. 7, there are two or more high radio frequency power "H" units with enough power transmission for coverage over the entire building. The rest of the units "R", "S" and "T" are the normal power units of proximity sensing systems. The high power unit is achieved by using a network server unit and adds RF power amplifiers to their transceivers, 66, in FIG. 4. These units can be located at a known fixed location or it has a precision GPS locator to give its actual position. One "H" unit is capable of communicating with at least another "H" unit. In addition, the two communicating "H1", 120, and "H2", 122, units (See FIG. 7) have to synchronize and coordinate such that both would not transmit at the same time. This is achieved by sending each other a prior to transmit notification signal, informing others that it will transmit in the next x milliseconds. All units receiving this signal, including the "H" unit will not enter into transmission mode. The first "H" unit has to establish itself as the super master. The "H" units will have their unique start and end sequence code for identifying themselves as "H" units. This will distinguish all messages from the proximity sensing systems units from the "H" units.

The H master unit will transmit its location, current time stamp and its transmission signal power strength level. Any proximity sensing systems normal units "R", 124, "S", 126, or "T", 128, within communication range from the two "H" units can determine their location by just measuring their distances between the two respective "H1", 120, and "H2, 122," units. FIG. 7 shows the distance between units "H1", 120, and "H2", 122, is known to be L1, 130. The triangle with sides L1, 130, L2, 132, and L3, 134, fixes the unit "R", 124, location. The "H1", 120, and "H2", 122, units identified their location either by pre-installation at a known location or by their GPS units.

Case 2 (Location Determination from One Distance Measurement from One "H" Unit)

In the scenario when only one "H" unit location is available, Unit "S" 126, can infer its location if it triangulates with unit "H1", 120, and another unit "T", 128, with sides L4, 136, L5, 138 and L6, 140. However, the absolute location of unit "T", 128, would not be known until it has determined its absolute location from the two H units using the triangle with sides L1, 130, L5, 138, and L7, 142.

Case 3 (Location Determination from Other Non "H" Units)

FIG. 8 shows that the mobile "U", 148, unit's location determination is to derive from two other non "H" units. FIG. 8 shows three mobile units, "R", 146, "T", 150, and "U", 148, where units "R", 146, and "T", 150, positions were previously determined from their triangulation described in Case 1 (FIG. 7). However, this assumes the units "R", 146, and "T", 150, locations were determined within a very short time before "U", 148, position is found. This is a quasi-static assumption.

By induction, the above steps can be repeated to determine all locations for any number of mobile units as long as they satisfy any one of the above cases under the quasi-static assumption.

7) Matrix Formulation of the Contact Tree Network Map

The overall contact network map can be represented in a matrix format. All the unique identifiers form a vector as illustrated by equation 2 as [RSTU].

The contact tracking network tree is formed as soon as all the units' locations are determined. This quasi static map relies on data recording scheme with the proper time stamp, the fixed locations coordinates and the relative locations coordinates. These distances among each other can be recorded as a square matrix, M. The Matrix formulation is shown in equation 2

$$\begin{vmatrix} R \\ S \\ T \\ U \end{vmatrix} = \begin{vmatrix} 0 & M12 & M13 & M14 \\ M21 & 0 & M23 & M24 \\ M31 & M32 & 0 & M34 \\ M41 & M42 & M43 & 0 \end{vmatrix} \begin{vmatrix} R \\ S \\ T \\ U \end{vmatrix} \quad (2)$$

The diagonal of the matrix is zero since the distance between itself is zero. The M12 value signifies the distance between unit R and unit S. M21 is equal in value to M12 since it refers to the same distance. This can be deduced further that the matrix is symmetric diagonally. In this example the contact tree map is essentially captured by the six upper diagonal elements of the matrix, M. The movements of the units are characterized by the change in values of elements of the matrix, M. The matrix representation over time is given by M [t]. Since all measurements are discrete or time slices of the matrix are available. These slices are represented as M [t0], M [t1], M [t2], and so on.

The following describes a method for searching the list of people from the contact tree network map. Since the magnitude of the elements of the matrix represents distance, the nearest neighbors are achieved by sorting the matrix elements from small to large values. For example the bubble sort algorithm is a method used to sort values of a set of numbers from small to large. Using the indices of the matrix elements sorted, the list of nearest neighbors from the nearest to the farthest is obtained.

A list of people who are within 5 feet over the last five hours from unit "R", 146, can be computed by first looking at the matrix time slices starting from the latest time and selecting the row elements, M12, M12, M13 whose values are smaller than 5. From the indices of the selected element, the persons in contact are identified through their unique identifier. We call these the first round of selected people. The same procedure is repeated to the list of selected people one time slice earlier. This will generate the second round of people in contact with the first round people within a distance of 5 feet. When this algorithm is repeated over all the time slices, it will produce a tree of people who came in contact with unit "R", 146, over the past five hours. Therefore a computer program written using the above algorithm generates efficiently the required contact list of people.

The above RF transceiver proximity measurement method can also be applied by other kinds sensing technologies used in a transceiver system such as Infrared, Optical or Ultrasound signals. Each kind of technology has their advantage based on the detection method. For example RF signals can penetrate through non-metallic walls and if the network map is only required within the confined of wall structures, RF method may not be the best. Sometimes a combination of detection methods may be necessary.

An RFID reader uses radio frequency to identify the presence of a Tag, which can come in the form of handheld equipment to a bulky doorway detector. Some of these RFID Tags are passive system, which means it draws power from the reader. The active RFID tags have their own power but all have to be able to be read at all ranges unless there are many readers deployed all over the building. These readers would all communicate through a network and report to a central computer system. Signification infrastructure layout and many readers installation are required. Many active RFID tags have position accuracies of 8 feet and above. Many disease communications require contact interactions less than 5 feet.

In the case of a GPS location identification system, it is possible to have each unit determining its position coordinates from three or more satellites at any given time. This is still a triangulation method for determining its location. It has the advantage of giving the absolute position and real time through its serial ports via standard protocols such as TSIP, NMEA and TAIP. The GPS can keep very accurate time.

8) Alternate Proximity Sensor with GPS Capability

Figure 9:
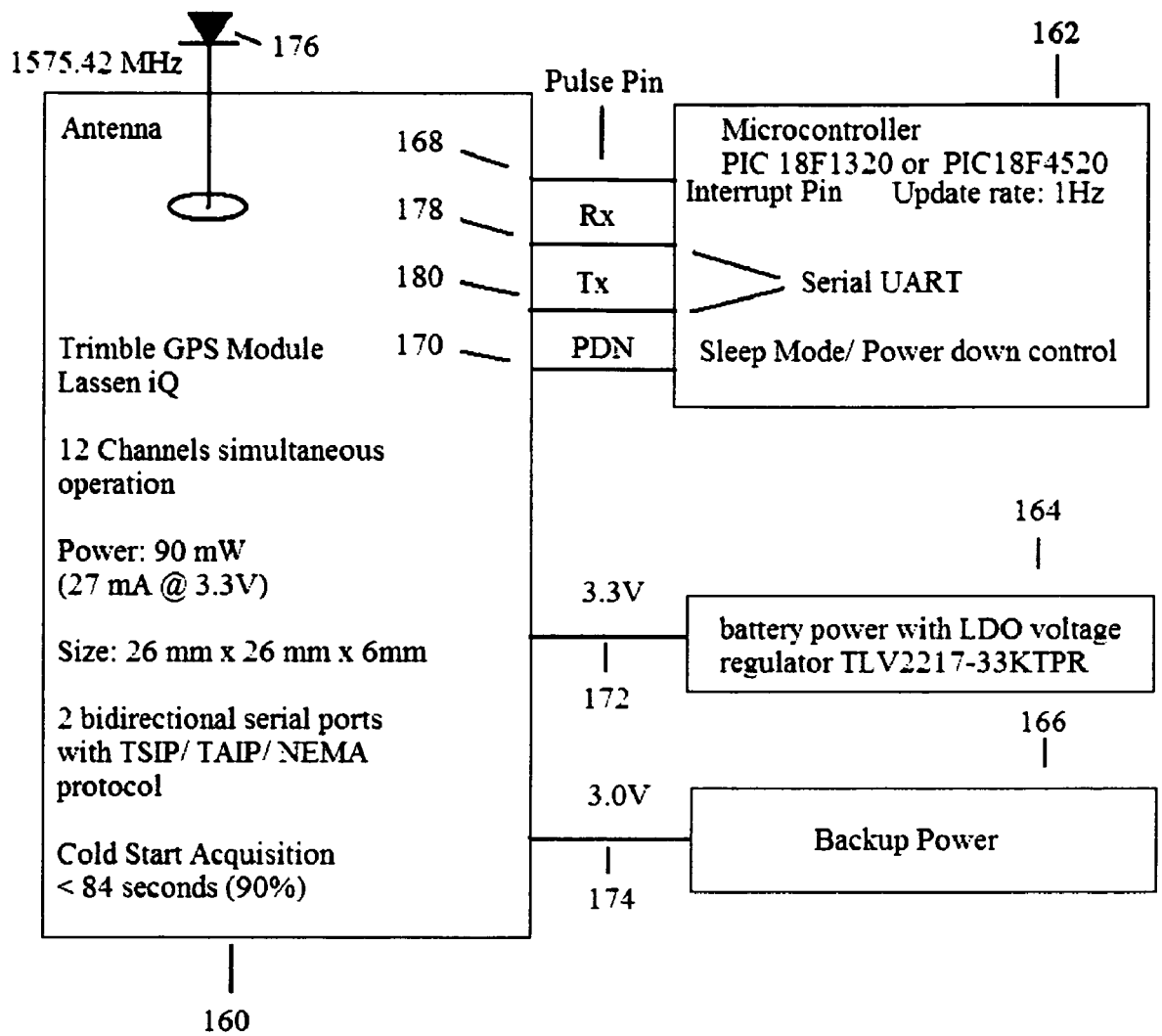
FIG. 9. Block diagram showing how a GPS module is connected to a microcontroller to implement a proximity sensing system.

FIG. 9 shows an example of a GPS location module 160 using Trimble Lassen iQ GPS Module. This module has 12 channels in simultaneous operation making it to capture the coordinates faster from the satellites. The worst case cold start acquisition time is less than 84 seconds at 90% of the time. Its low power 90 mW operation at 3.3V lends itself to be battery, 164, operated. The size of 26 mm×26 mm×6 mm is a small form factor fit to be used as a proximity sensor unit. The 2 bidirectional serial port using the TAIP/NEMA protocol allows it to communicate via the Rx 178, Tx lines, 180, with the microcontroller, 162, PIC 18F4520 or PIC 18F1320.

When the GPS signal is available, the pulse pin, 168, sends an interrupt signal to the microcontroller to start reading the GPS data. This update rate of 1.0 Hz is very accurate and can be used as a time reference. Usually, its accuracy is good to 1 nanosecond. All the proximity sensing devices can communicate with those devices with GPS modules to synchronize its clock. In order for this to do so, the device can contain both the GPS module and the RF module because they both operate on different frequencies. The RF module will do the communication and the GPS module will provide absolute location and time for synchronization. In such cases the RTOS feature may not be critical even for units without GPS as long as the device can derive its real time from those who have indirectly.

In addition there is a power down mode controlled by line PDN, 170. This extends battery life significantly with a 3.0 v backup power, 166, via line 174.

The drawback of a commercial GPS application, the location resolution of ~10 meters or 30 feet which may not be adequate for some applications. The version with military precision will not have this issue. The acquisition time from cold start at 84 seconds can be too slow for some applications. A GPS system alone is not sufficient in creating the fine resolution contact network map. A combination of RF or other communication scheme is required to communicate among each other bi-directionally to collect all the positions of its neighbors.

The use of one or more units with GPS for identifying location each cluster can be complemented with other proximity detection methods within the cluster for obtaining both relative and absolute positions.

Some cellular phones are equipped with the capability of location through triangulation. Therefore if the cellular phone is active, it can function as a proximity sensor system. It has the advantage that it as a built in communication networks. However, the disadvantage is that people do not attach or turn on the cell phone all the time.

Zigbee network devices can be modified accordingly to perform functions of the proximity sensing unit. It has a routing table that is based on end devices to parent reporting structure rather than nearest neighbors. Furthermore, this table is not accessible and the discovery time can be very large when there are more than 100 units. The enhanced feature of location measurements by Chipcon chipset CC2431 make these devices more like GPS location devices but more accurate (~1.5 feet). In order to avoid long discovery times, routers that do not sleep can be used. The coordinator device becomes the network server. Many of these devices do not have enough program memory left behind as the Zigbee stack is very large. Additional memory and an added microcontroller may be necessary for its implementation.

I claim:

1. A contact tracking system comprising:
   means for maintaining a database of contact information;
   a plurality of mobile proximity sensing units, each unit containing means for maintaining contact history entries including
   a relative proximity to another contacted unit;
   a unique identifier of the another contacted unit; and
   a timestamp of the contact with the another contacted unit; and
   a contact map data entry device including means for
   receiving contact history entries from the plurality of mobile proximity sensing units;

condensing redundant contact history entries by eliminating complementary contact information; and uploading condensed contact history entries to the means for maintaining the database of contact information.

2. The contact tracking system of claim 1, wherein each contact map data entry device of a plurality of contact map data entry devices uploads condensed contact history entries to the network server only after receiving contact history entries from another contact map data entry device.

3. A method of tracking contacts between a plurality of mobile proximity sensing units comprising:
(a) maintaining, on a plurality of mobile proximity sensing units, contact history entries, each contact history entry including,
   (i) proximity to another contacted unit,
   (ii) a unique identifier of the another contacted unit, and
   (iii) a timestamp of the contact with the another contacted unit;
(b) transmitting contact history entries from the plurality of mobile proximity sensing units to at least one contact map data entry device;
(c) uploading, from the at least one contact map data entry device, contact data;
(d) maintaining, with a network server, a database of contact information; and
(e) in response to a request for a history of contacts with a mobile proximity sensing unit of interest, (i) identifying a first set of mobile proximity sensing units that were in contact with the mobile proximity sensing units, and (ii) identifying a second set of mobile sensing units that were in contact with the first set of mobile proximity sensing units.

4. The method of claim 3, further comprising clearing contact history entries from a given mobile proximity sensing unit after the given unit transmits contact history entries to the at least one contact map data entry device.

5. The method of claim 3, wherein each contact history entry further includes a relative vector location with respect to the another contacted unit.

6. The method of claim 3, further comprising sensing at least one of temperature, radiation exposure, and virus exposure during the contact with the another contacted unit.

7. The method of claim 3, further comprising:
querying the database of contact information;
identifying mobile proximity sensing units corresponding to the query; and
generating a report of individuals corresponding to the identified mobile proximity sensing units.

8. The method of claim 3 wherein the step of identifying a first set of mobile proximity sensing units that were in contact with a mobile proximity sensing unit of interest includes a step of generating a matrix of distances between the mobile proximity sensing unit of interest and other mobile proximity sensing units.

9. The method of claim 3 wherein the step of identifying a first set of mobile proximity sensing units that were in contact with a mobile proximity sensing unit of interest includes steps of:
(i) identifying a set of mobile proximity sensing units that were in contact with a mobile proximity sensing unit of interest during a first time period,
(ii) identifying a set of mobile proximity sensing units that were in contact with the mobile proximity sensing unit of interest during a second time period, and
(iii) from the sets of mobile proximity sensing units that were in contact with the mobile proximity sensing unit of interest during the first and second time periods, forming the first set of mobile proximity sensing units that were in contact with a mobile proximity sensing unit of interest.

10. The method of claim 3 wherein the step of identifying a first set of mobile proximity sensing units that were in contact with the mobile proximity sensing unit of interest includes a step of sorting entries in a matrix of distances between the mobile proximity sensing unit of interest and other mobile proximity sensing units.

* * * * *